A. F. THOMPSON.
NUT LOCK.
APPLICATION FILED FEB. 6, 1920.

1,341,604.  Patented May 25, 1920.

Witnesses

Inventor
A. F. Thompson
By Victor J. Evans
Attorney

UNITED STATES PATENT OFFICE.

ANDREW F. THOMPSON, OF WELLINGTON, KANSAS.

NUT-LOCK.

1,341,604. Specification of Letters Patent. Patented May 25, 1920.

Application filed February 6, 1920. Serial No. 356,646.

*To all whom it may concern:*

Be it known that I, ANDREW F. THOMPSON, a citizen of the United States, residing at Wellington, in the county of Sumner and State of Kansas, have invented new and useful Improvements in Nut-Locks, of which the following is a specification.

This invention relates to lock nuts and has for its object the provision of a bolt having a squared end portion, and a nut threaded upon the bolt and having the outer end of its bore squared for coöperative relation with the squared portion of the bolt, wedge members being insertible between the squared portion of the bolt and nut and springing into openings formed in the nut whereby when the nut is once locked rotation thereof will be absolutely prevented.

An important object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1:
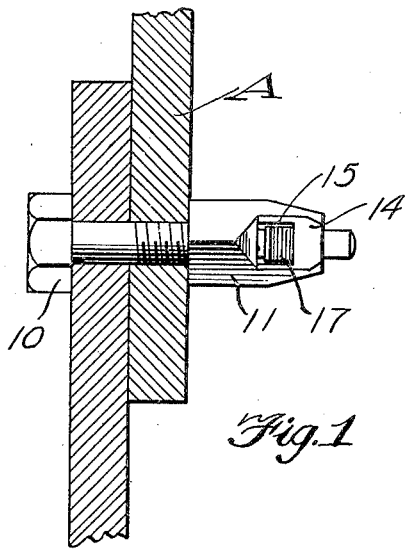
Figure 2:
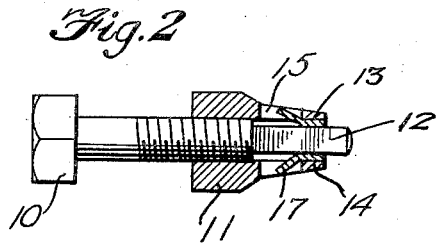
Figure 3:
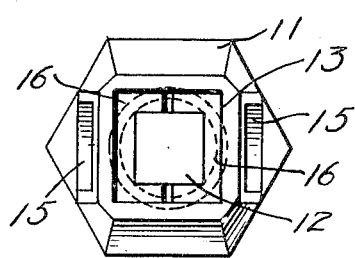
Figure 4:
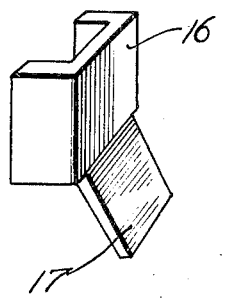

Figure 1 is a cross sectional view through structural elements secured together by means of my bolt and nut, Fig. 2 is a view of the nut and bolt, the nut being shown in longitudinal section, Fig. 3 is an end elevation of the bolt and nut, and Fig. 4 is a perspective view of one of the locking members.

Referring more particularly to the drawings, the letter A designates structural elements secured together by means of my bolt 10 and nut 11. In carrying out my invention the bolt 10 has its end portion reduced and squared, as shown at 12. The nut 11 is of greater width than the ordinary nut and has a portion of its bore threaded for engagement upon the bolt and the outer portion of its bore enlarged and formed square, as shown at 13. The width of the squared bore in the nut is greater than the thickness of the squared portion of the bolt diagonally from corner to corner so that the nut may be rotated upon the bolt. The portion of the nut which is provided with the squared bore forms a hood 14 and this hood is provided at opposite sides with rectangular openings 15 leading into the squared bore 13.

I also make use of a pair of locking members which are formed of resilient metal and each of which includes a U-shaped portion 16 adapted for straddling engagement upon the squared portion 12 of the bolt and further includes a laterally flaring tongue 17 adapted to engage within the openings 15 in the nut.

In the use of the device the bolt is inserted through registering holes in the elements to be secured and the nut is then threaded onto the bolt and screwed down in the ordinary manner. The nut and bolt should, when properly adjusted, be in such position that the squared portion 12 of the bolt will have its sides parallel with the sides of the squared bore 13 of the nut and it will be apparent that a space will exist entirely around the squared portion of the bolt. The members may than be inserted within this space and are forced slidably along the squared portion of the bolt until the tongues 17 snap into the openings 15 in the nut. These locking members are of such size as to fill the space surrounding the squared portion of the bolt and it will be apparent that thereafter it will be impossible to rotate the nut in either direction after the locking members are applied.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination, a bolt having its end portion reduced and squared, a nut having a portion of its bore threaded for engagement upon the bolt and having the outer portion of its bore squared and of greater width than the thickness of the squared portion of the bolt diagonally from corner to corner, the nut being further provided with openings leading into the squared bore therein, and locking members engageable between the squared end of the bolt and the walls of the squared bore of the nut and having outwardly springing tongues engageable within said openings.

2. In combination, a bolt having its end portion reduced and squared, a nut having the inner end of its bore threaded for engagement upon the nut and having the outer end of its bore squared, said nut being further provided on opposite sides with openings leading into the squared portion of the bore, and locking members engageable between the squared end of the bolt and the squared bore, each locking member including a substantially U-shaped body straddlingly engaging upon the squared end of the bolt and an outwardly extending resilient tongue adapted to snap into the openings.

3. In combination, a bolt having its end portion squared, a nut threaded upon the bolt and having a portion of its bore squared and having openings, and locking members disposed between the squared end of the bolt and the walls of the squared bore of the nut and having outwardly springing tongues engageable within said openings.

In testimony whereof I affix my signature.

ANDREW F. THOMPSON.